June 10, 1941.    P. CARLTON    2,245,386
PISTON RING
Filed Nov. 28, 1938

INVENTOR
PAUL CARLTON
BY
ATTORNEY

Patented June 10, 1941

2,245,386

UNITED STATES PATENT OFFICE 2,245,386

PISTON RING

Paul Carlton, St. Louis, Mo., assignor to William N. Bachman, Mathew Jellinels, and Paul Carlton, copartners doing business under the name of Berul Piston Ring Company, St. Louis, Mo.

Application November 28, 1938, Serial No. 242,762

6 Claims. (Cl. 309—45)

This invention relates to a certain new and useful improvement in piston-rings and has for its primary objects the provision of a composite piston-ring comprising co-operable spring-steel and cast-iron members, which accurately conforms to the circular contour of the cylinder-wall and piston grooves, which provides a unique explosion-tight seal and maintains greater bearing surface between the piston and cylinder walls, which has a continuous cylinder wall engaging surface around the entire periphery of the cylinder-wall, and which is highly efficient in the performance of its stated functions.

And with the above and other objects in view, my invention resides in the novel features of form, construction, arrangement, and combination of parts presently described and pointed out in the claims.

In the accompanying drawing—

Figure 1:
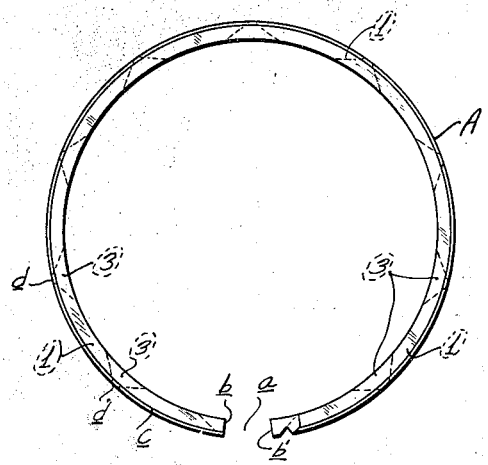
Figure 1 is an end view of the cast-iron member of a component ring embodying my present invention.
Figure 3:
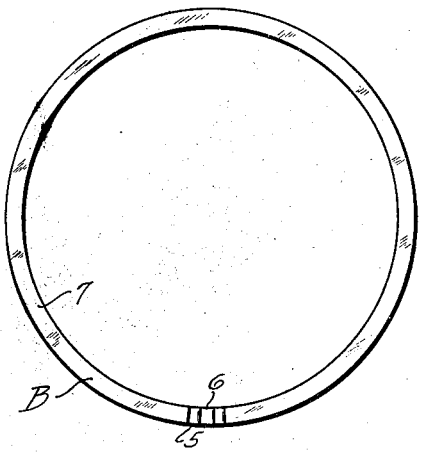
Figure 3 is an end view of the spring-steel member of the component ring of my present invention.

Referring now in more detail and by reference characters to the drawing, which illustrates practical embodiments of my present invention, A designates the ring-member which preferably is constructed and machined from cast-iron, the ring-member A being of split-type and its gap $a$ being of such size and dimensions for ring compression with its ends $b$ in substantially abutting engagement for snug fitting circular disposition within the particular cylinder.

Diametrically through its body, the ring-member A is formed with a circumferential series of spaced oil or ventilation slots $l$, which obviously are substantially smaller in height than the overall thickness of the ring A and are of greater peripheral length at the outer, than at the inner, periphery of the ring, the slots $l$ tapering uniformly toward the inner periphery of the ring A for communication with the oil channel or passage usually present in the rear wall of the piston-ring groove in which the ring A may be seated.

Figure 2:
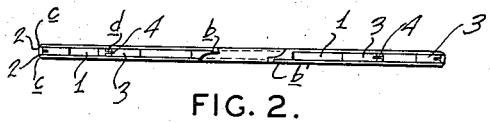
Figure 2 is a plan view of the ring-member of Figure 1.

At its opposite, or upper and lower, outer peripheral edges, the ring A is preferably chamfered or beveled inwardly, as at $c$, in the provision of annular oil scraping edges 2, all as best seen in Figures 1 and 2.

By reference to Figure 1, it will be evident that solid integral portions 3 of the ring A remain interposed between the respective slots $l$, which portions or pillars 3, as they may be called, by reason of the form of the slots $l$, will be of somewhat trapezoidal shape in horizontal cross section with a relatively small peripheral area $d$ at the outer peripheral face of the ring A, each pillar 3 being provided across its outer face $d$ with a small shallow transverse cut or relief channel 4 for equalizing the oil flow through the various slots $l$.

Figure 4:
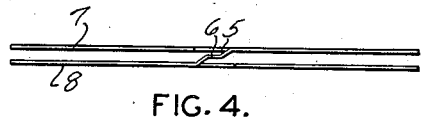
Figure 4 is a plan view of the ring-member of Figure 3.
Figure 5:
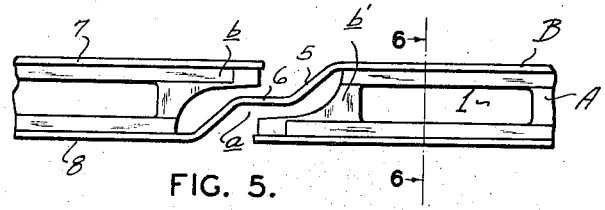
Figure 5 is a fragmentary elevational view of a composite piston ring of my present invention, illustrating in detail the joint-forming ends of the members thereof.
Figure 6:
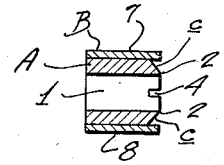
Figure 6 is a transverse sectional view of the ring, taken approximately along the line 6—6, Figure 5.

B designates the spring-steel component member of the ring, which comprises a double helical turn of flat ribbon steel preferably of the same radial width as the ring-member A and having an intermediate turn 5 preferably deformed to a step-like shape, so that such intermediate turn will lie in two planes on the respective sides of a centrally disposed mid-portion 6, which latter is substantially in a plane parallel to the respective planes of the upper and lower helix turns 7, 8. The intermediate turn 5 is of such dimensions that the upper and lower helix turns 7, 8, will be spaced from each other by a distance precisely equal to the overall thickness of the cast-iron ring-member A, as best seen by comparison between Figures 2 and 4. The ring-member A is slipped or threaded between the upper and lower helix turns 7, 8, of the ring-member B, the intermediate or step-like turn 5 of the member B being disposed symmetrically in and across the gap $a$ of the member A in such manner that, when the composite piston-ring is compressed into circular form within the cylinder for cylinder wall engagement, the abutting end-faces $b$, $b'$, of the member A will slide along the opposite faces of the intermediate step-like turn 5 of the member B, as best seen in Figure 5, so that the gap or space between the ring-ends $b$, $b'$, in the present composite ring will be permanently sealed, thus preventing any danger of blow-by in the piston.

Figure 7:
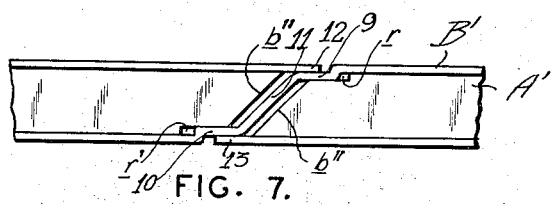
Figures 7 and 8 are enlarged fragmentary elevational views of slightly modified forms of composite rings embodying my present invention.

I have also found that I may provide a composite ring of similarly improved characteristics comprising a cast-iron member A' having matching chamfered end faces b'', each cut away along opposite top faces of the member A' in the provision of recesses r, r'. Disposed around the member A' is a spring-steel member B' substantially similar in construction to the previously described spring-steel member B, and having a deformed intermediate portion 5' including two parallel step-sections 9, 10, and a central diagonal section 11. The recesses r, r', are sized to accommodate the step-sections 9, 10, of the spring-steel member B, and the step-sections 9, 10, are, in turn, sized to accommodate the end-overlap sections 12, 13, thereof. Thus, the respective depths of both the step-sections 9, 10, and the corresponding recesses r, r', are equal to the thickness of the spring-steel member B, all as best seen in Figure 7.

Figure 8:
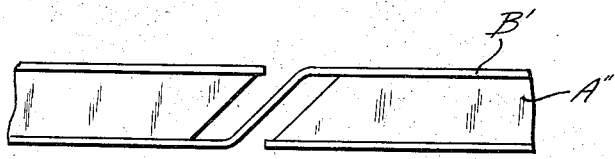

I have also found that with a ring-member B', I may also provide a solid cast-iron ring-member A'' having no oil slots whatsoever, as shown in Figure 8. Piston-rings of my present invention have been found by actual use and practice to be far more leakproof than other types of piston-rings of this general character, so far as I am aware, since the present ring has a continuous circumferential contact with the cylinder wall and, at the same time, has the advantageous properties resulting from the presence of a material having a co-efficient of expansion substantially identical with the co-efficient of expansion of the cylinder block and piston. The present ring also provides for a greater number of oil-scraping edges, so that the lubricants which splash up the side of the cylinder-wall during normal motor operation will be much more efficiently scraped down and returned to the crank case.

It should be understood that changes and modifications in the form, construction, arrangement, and combination of the several parts of the piston-ring may be made and substituted for those herein shown and described without departing from the nature and principle of my invention.

Having thus described my invention, what I claim and desire to secure by Letters Patent is—

1. A composite piston-ring comprising, in combination, a flat split-ring and a pair of ribbon-steel ring-members respectively disposed flatwise upon the opposite end-walls of the split-ring, said steel-rings being integrally connected the one to the other by an intermediate section extending transversely through the gap between the ends of the split-ring and having a central step-like portion, said flat split-ring being cut-away at its ends for complementarily fitted disposition around the step-like portion.

2. A composite piston-ring comprising, in combination, a flat split-ring and a pair of ribbon-steel ring-members respectively disposed flatwise upon the opposite end-walls of the split-ring, said steel-rings being integrally connected the one to the other by an intermediate section of step-like conformation extending transversely through the gap between the ends of the split-ring.

3. A composite piston-ring comprising, in combination, a flat split-ring and a pair of ribbon-steel ring-members respectively disposed flatwise upon the opposite end-walls of the split-ring, said steel-rings being integrally connected the one to the other by an intermediate section of step-like conformation extending transversely through the gap between the ends of the split-ring and said split-ring being at its ends transversely cut away to clear the step-like intermediate steel-ring portion when the ring is radially compressed.

4. A composite piston-ring comprising, in combination, a flat split-ring co-operatively disposed within a spring-steel ring including a pair of ribbon-steel ring members respectively disposed flatwise upon the upper and lower faces of the split-ring and being integrally connected the one to the other by an intermediate section extending transversely through the split of the split-ring, said intermediate section being deformed to provide a pair of parallel step-like portions connected by a centrally disposed diagonal portion, said split-ring being at its ends cut away complementarily to said intermediate section for smooth fitting abutment therewith.

5. A composite piston-ring comprising, in combination, a flat split-ring co-operatively disposed within a spring-steel ring including a pair of ribbon-steel ring members respectively disposed flatwise upon the upper and lower faces of the split-ring and being integrally connected the one to the other by an intermediate section extending transversely through the split of the split-ring, said intermediate section being deformed to provide a pair of parallel step-like portions connected by a centrally disposed diagonal portion, said split-ring being at its ends transversely beveled for smooth fitting abutment against the respective opposite sides of the diagonal portion of the steel ring and being further provided inwardly of said beveled faces with circumferential recesses sized for accommodating the step-like portions of said steel ring.

6. A composite piston-ring comprising, in combination, a flat split-ring co-operatively disposed within a spring-steel ring including a pair of ribbon-steel ring members respectively disposed flatwise upon the upper and lower faces of the split-ring and being integrally connected the one to the other by an intermediate section extending transversely through the split of the split-ring, said intermediate section being deformed to provide a pair of parallel step-like portions connected by a centrally disposed flat portion, said split-ring being at its ends cut away in the provision of oppositely presented arcuate recesses for clearing the centrally disposed flat portion.

PAUL CARLTON.